(No Model.)
G. R. REEVES.
DUST COLLECTOR.
No. 416,124. Patented Nov. 26, 1889.
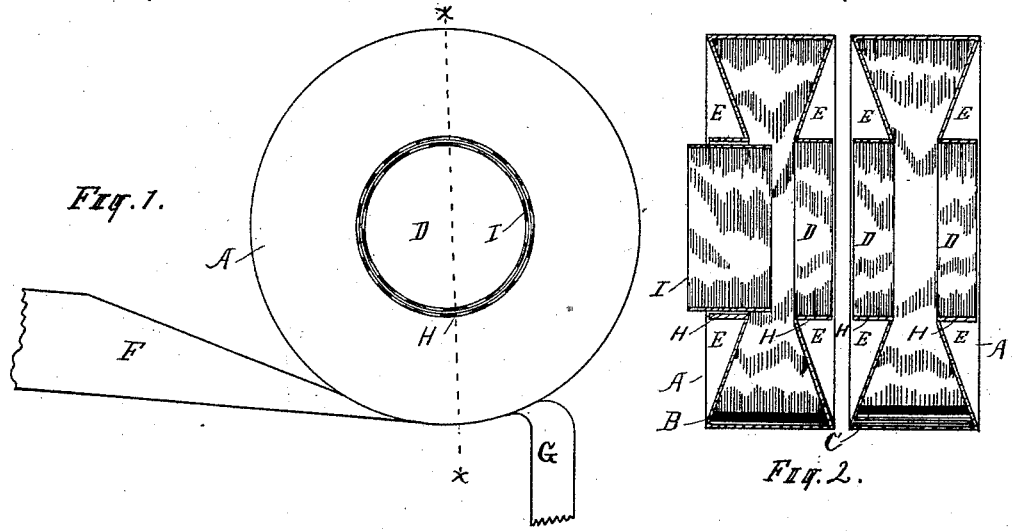
Fig. 1.
Fig. 2.
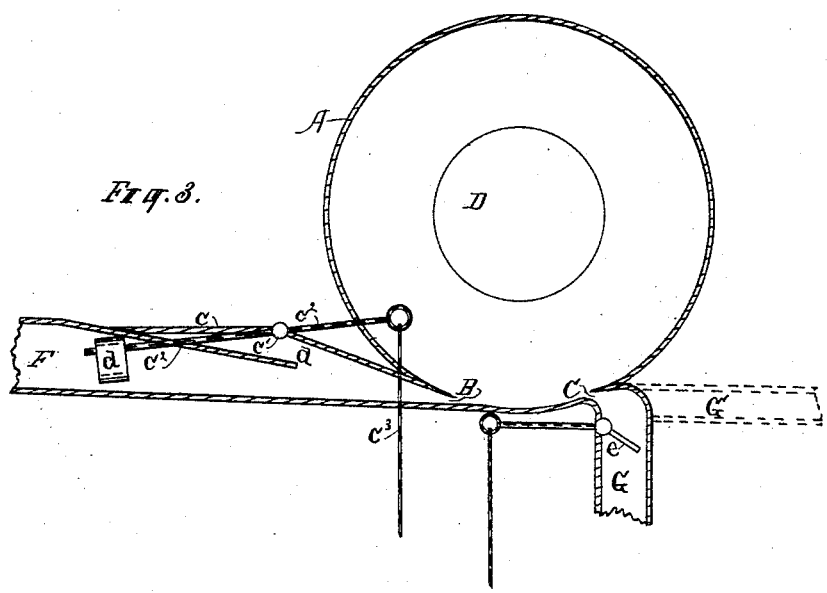
Fig. 3.
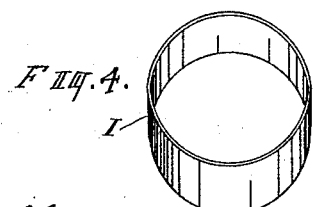
Fig. 4.
WITNESSES:
H. Schuff
Geo. H. White.
INVENTOR
George R. Reeves
BY
Ithiel J. Cilley
ATTORNEY.

United States Patent Office.

GEORGE R. REEVES, OF GRAND RAPIDS, MICHIGAN.

DUST-COLLECTOR.

SPECIFICATION forming part of Letters Patent No. 416,124, dated November 26, 1889.

Application filed July 25, 1888. Serial No. 281,031. (No model.)

*To all whom it may concern:*

Be it known that I, GEORGE R. REEVES, a citizen of the United States, residing at Grand Rapids, in the county of Kent and State of Michigan, have invented a new and useful Improvement in Dust Collectors and Separators, of which the following is a specification.

My invention relates to improvements in dust-collectors for use in planing-mills, factories, grist-mills, and other places where it is necessary or desirable to collect dust, shavings, &c., and deposit them in a storage-bin or otherwise convey them from the building by means of blowers, and ultimately separate the shavings or dust from the air that conveys them; and the objects of my invention are, first, to dispense with giving the dust-laden air a centrifugal motion to separate the dust therefrom; second, to provide a dust-collector from which the purified air will escape by natural circulation; third, to provide a dust-collector in which any dust that may be carried past the exit-opening when passing through the separating-cylinder will invariably return to the point of entrance and again enter the column of dust-laden air; fourth, to provide a dust-collector with which I can regulate, first, the velocity of the incoming column of dust-laden air; second, the pressure of air in the separating-cylinder; third, the escape of air from the separating-cylinder; and, fourth, the velocity with which the dust and shavings are ejected from the separating-cylinder; fifth, to obviate the necessity of using spiral wings or backward-projecting openings in the separating-cylinder to facilitate the separation of the dust, &c., from the air; and, sixth, to provide a dust-collector in which I can vary the capacity, so that the same separating-cylinder may be made to separate a small amount of shavings, dust, &c., from a slight current of air, or a large amount from a strong current of air. I attain these objects by the mechanism illustrated in the accompanying drawings, in which—

Figure 1 is a side elevation of my dust-collector. Fig. 2 is a transverse vertical section of the same on the line $xx$ of Fig. 1. Fig. 3 is a longitudinal vertical section through Fig. 1, and Fig. 4 is a perspective of my governor-thimble.

Similar letters refer to similar parts throughout the several views.

A represents the separating cylinder or drum, where the dust, &c., is separated from the air.

B is the opening for the ingress of the dust-laden air.

C is an opening for the egress of the dust, shavings, &c.

D represents an opening through each side of the cylinder for the escape of the purified air.

E, Fig. 2, shows the form of the side walls of the cylinder.

F is the conductor-pipe leading from the blower to the separating-cylinder for the passage of the dust-laden air.

G is the conductor-pipe leading from the dust-exit opening C in the separating-cylinder to the storage-bin.

H H are thimbles projecting outward from the air-escape D in the walls of the separating-cylinder.

I I are adjustable thimbles arranged to insert into the permanent thimbles H, for the purpose of regulating the outflow of air from the separating-cylinder.

c is a trap or automatic valve in the conductor-pipe F, for regulating the pressure of air in the separating-cylinder.

$c'$ is a rod, $c^2$ a lever, $c^3$ a cord, and $d$ a weight, arranged for the manipulation of the valve $c$.

e is a valve in the exit-pipe G, for regulating the outflow of the dust, shavings, &c., and the dotted lines G' represent a second conductor-pipe arranged for conducting dust, &c., to a second storage-bin, to the arch, or to any other desired point.

I make my separating-cylinder circular and stand it upon the edge, as shown in Figs. 1 and 3. Its sides are concave or funnel-shaped, with the points projecting in toward the center of the cylinder, as shown at E in Fig. 2, the object of this form being, first, to strengthen the side walls of the cylinder; second, to so arrange the expanding volume of outflowing air that it will exert a sufficient pressure upon the moving column of dust, &c., through the cylinder in a manner that will spread it out in a thin sheet extending across the entire width of the bottom of the cylinder when it reaches the dust-exit opening C, and, third, to so regulate the expansion of the air in the cylinder that the traveling column will be held to the periphery of the cylinder, and no air will escape through the air-exits except by natural circulation, thus holding any dust that may chance to pass the dust-exit in the first round to the periphery of the cylinder until it is brought back to and re-enters the incoming column of dust-laden air, with which it is again carried to the dust-exit and out of the cylinder to the storage-bin.

The dust-laden air should enter the separating-cylinder in a thin broad column at the bottom of the cylinder, and for this purpose I incline the upper wall of the conductor-pipe F, as it approaches the cylinder, downward and extend it sidewise, so that it will form a narrow opening at B, extending across the entire width of the cylinder, or nearly so, thus causing the dust-laden air to enter the cylinder in a thin broad column with a sufficient downward motion to hold the dust snugly against the bottom of the cylinder while passing through. The dust-exit opening C is made in the bottom of the cylinder directly opposite the ingress-opening B, hereinbefore described. This opening I make considerably narrower than the ingress-opening and extend it across the entire width of the cylinder, as shown at C, Fig. 2, with its upper wall level with or a trifle above the upper wall of the ingress-opening. The bottom of the separating-cylinder between the openings B and C may retain the circular form of the cylinder, as shown in Fig. 1, in which case I find it well to allow the upper wall of the exit-opening to project in a trifle beyond the lower wall of the cylinder; or it may be formed by continuing the bottom of the conductor-pipe across the bottom of the cylinder to the exit-opening, as shown in Fig. 3.

For the escape of the purified air from the cylinder I form an opening D in the center of each side wall. By this arrangement, when the dust-laden air enters the cylinder the air immediately begins to expand and seek a source of escape, and naturally flows out of the openings D, while the dust, shavings, &c., being thrown to the bottom of the cylinder and held against it by the peculiar action of the escaping air upon the inclined side walls of the cylinder, pass directly to and through the exit-opening C and conductor-pipe G into the storage-bin.

I sometimes attach thimbles H to the side walls of the cylinder in the openings D for the purpose, first, of strengthening the walls of the cylinder at this point; second, to steady the outflowing current of purified air, and, third, to support the adjustable thimbles or governors I, hereinafter more fully explained.

When constructing my dust-collectors for use where it is necessary or desirable to vary the pressure in the separating-cylinder, I first form a thimble or thimbles I of a proper diametrical size to exactly fit inside of the thimbles H and of a proper length to reach through these thimbles and entirely close the opening between the side walls of the cylinder, when desired. I then form a backwardly-projecting opening $a$ in the upper wall of the conductor-pipe F, in which I place a door or valve $c$, which is supported by a rod $c'$, the valve being long enough to reach to and rest upon the opposite wall of the opening.

To one end of the rod $c'$, I attach a lever $c^2$, which is provided at one end with a cord $c^3$, with which to open and close the valve by hand, when desired, and at the other end with a weight $d$, which may be adjusted upon the lever, so as to hold the valve down upon the walls of the opening with such force as is necessary to insure the desired pressure in the cylinder. By a proper manipulation of these valves the pressure in the separating-cylinder may be so regulated that the dust, &c., will simply pass through the cylinder and out of the pipe G by the impetus gained while passing from the blower to the cylinder; or the entire force of the blower, or any less pressure may be thrown into the separating-cylinder and forced through the discharge-pipe to any desired place of storage. I sometimes place a gate or valve $e$ in the discharge-pipe, also, and attach one or more auxiliary spouts, as indicated by the dotted lines G'. This valve may be so manipulated that a portion or the whole of the dust, &c., may be forced through the added pipe or pipes into a second storage-bin, to the boiler-arch, (as a self-feeder,) or to any other desired point.

It will be readily seen that with the weight $d$ properly adjusted, if more pressure is generated in the cylinder than is desired, the valve $c$ will be forced open and the surplus air allowed to escape by this source before entering the cylinder, while the escape of air from the cylinder is regulated by increasing or diminishing the width of the opening between the thimbles I.

I am aware that prior to my invention dust-collectors have been made in which backwardly-projecting openings have been placed in the conductor-pipe for the escape of air. I therefore do not claim this in its simple form as my invention; nor do I claim the use of one or more discharge-pipes for the escape of dust, shavings, &c., from the separating-cylinder as new; but,

Having thus fully described my invention, what I claim as new, and desire to secure by Letters Patent of the United States, is—

1. A dust-collector consisting of a separating-cylinder A, provided with openings D through its sides for the escape of purified air, an opening B through the periphery of the separating-cylinder at the bottom for the entrance of dust-laden air, and an opening C directly opposite for the escape of dust, substantially as and for the purpose set forth.

2. The combination, in a dust-collector, of a horizontal cylinder provided with openings in its side walls for the escape of purified air, an opening at one side of the bottom of the cylinder for the entrance of the dust-laden air, an opening directly opposite for the escape of dust from the cylinder, an opening in the conductor-pipe, a valve, a rod, a lever, a weight, and a cord for operating said valve, substantially as specified, and for the purpose set forth.

3. The combination, in a dust-collector, of a horizontal cylinder having inwardly-projecting funnel-shaped sides provided with openings for the escape of purified air, stationary thimbles attached to said openings and projecting outward, adjustable thimbles made to be inserted in the stationary thimbles for governing the outflow of air, an opening at the bottom of the periphery of the cylinder for the ingress of dust-laden air, and an opening directly opposite for the escape of dust, &c., substantially as and for the purpose set forth.

4. The combination, in a dust-collector, of a horizontal cylinder with the ends projecting funnel-shaped toward the center, and provided with openings for the escape of purified air, outwardly-projecting stationary thimbles H, adjustable thimbles I, ingress-opening B, egress-opening C, an opening $a$ in the conductor-pipe, a valve $c$, lever $c^2$, and weight $d$, substantially as and for the purpose set forth.

5. The combination, in a dust-collector, of a separating-cylinder having inwardly-projecting concave sides provided with openings for the escape of purified air, stationary thimbles H, adjustable thimbles I, openings in the bottom of the cylinder for the ingress of dust-laden air and the egress of dust, &c., an opening $a$ in the conductor-pipe, a valve, a lever, a weight, and a cord for operating said valve, and discharge-pipes having a valve provided with a lever and a cord for operating the valve, substantially as and for the purpose set forth.

Signed at Grand Rapids, Michigan, this 18th day of July, 1888.

GEORGE R. REEVES.

In presence of—
ITHIEL J. CILLEY,
GEO. M. PEMBRO.